US009515515B2

(12) United States Patent
Kim

(10) Patent No.: US 9,515,515 B2
(45) Date of Patent: Dec. 6, 2016

(54) CONTACTLESS CHARGING SYSTEM AND CONTACTLESS CHARGING METHOD

(71) Applicant: Seon Seob Kim, Incheon (KR)

(72) Inventor: Seon Seob Kim, Incheon (KR)

( * ) Notice: Subject to any disclaimer, the term of this patent is extended or adjusted under 35 U.S.C. 154(b) by 0 days.

(21) Appl. No.: 14/353,785

(22) PCT Filed: Oct. 11, 2012

(86) PCT No.: PCT/KR2012/008281
§ 371 (c)(1),
(2) Date: Apr. 24, 2014

(87) PCT Pub. No.: WO2013/062253
PCT Pub. Date: May 2, 2013

(65) Prior Publication Data
US 2014/0300317 A1    Oct. 9, 2014

(30) Foreign Application Priority Data

Oct. 25, 2011  (KR) .................. 10-2011-0109248
Nov. 8, 2011   (KR) .................. 10-2011-0116100
Apr. 25, 2012  (KR) .................. 10-2012-0043508

(51) Int. Cl.
*H02J 7/00*     (2006.01)
*H02J 17/00*    (2006.01)
(Continued)

(52) U.S. Cl.
CPC ............. *H02J 7/025* (2013.01); *H02J 5/005* (2013.01); *H02J 7/0042* (2013.01); *H02J 7/04* (2013.01); *H02J 17/00* (2013.01)

(58) Field of Classification Search
CPC ........... H02J 7/025; H02J 7/0042; H02J 7/04; H02J 17/00
(Continued)

(56) References Cited

U.S. PATENT DOCUMENTS 9,007,019 B2 *  4/2015  Iijima .................. H02J 7/0052
                                                          320/108
9,396,867 B2 *  7/2016  Kurs ....................... H01F 37/00
(Continued)

FOREIGN PATENT DOCUMENTS

DE     102004039648 A1    3/2006
EP         2068418 A2    10/2009
(Continued)

OTHER PUBLICATIONS

Takeshi et al., Machine English Translation of Japanese Patent Document No. JP-2010-206871, published Feb. 27, 2009, machine translated on Oct. 19, 2015 by machine translation tool at JPO, 15 pages.*

*Primary Examiner* — Phallaka Kik
(74) *Attorney, Agent, or Firm* — STIP Law Group, LLC

(57) ABSTRACT

A contactless charging system of the disclosure includes a transmitting unit having a primary coil and a receiving unit having a secondary coil and which charges a battery electrically connected to the secondary coil by the electromagnetic induction generated between the primary coil and the secondary coil and which supplements the charging efficiency of the battery by varying a charging frequency used in the electromagnetic induction in proportion to the charging efficiency of the battery that varies according to the position of the secondary coil relative to the primary coil. In addition, a contactless charging method of the disclosure includes a step of detecting a charging frequency when a charging operation is performed by enabling the primary coil to get close to the secondary coil, and a step of outputting the charging efficiency of the battery acquired from the detected charging frequency such that a user may know the charging efficiency.

6 Claims, 7 Drawing Sheets

(51) Int. Cl.
  *H02J 7/02* (2016.01)
  *H02J 7/04* (2006.01)
  *H02J 5/00* (2016.01)
(58) Field of Classification Search
  USPC .................................................. 320/108, 109
  See application file for complete search history.

(56) References Cited

U.S. PATENT DOCUMENTS

| | | | | |
|---|---|---|---|---|
| 9,402,154 | B2* | 7/2016 | Houri | H04W 4/021 |
| 2005/0075697 | A1* | 4/2005 | Olson | A61N 1/3787 |
| | | | | 607/61 |
| 2009/0140691 | A1* | 6/2009 | Jung | H02J 7/025 |
| | | | | 320/108 |
| 2010/0156343 | A1* | 6/2010 | Jung | H02J 5/005 |
| | | | | 320/108 |
| 2010/0259214 | A1* | 10/2010 | Sip | H02J 7/025 |
| | | | | 320/108 |
| 2011/0018499 | A1* | 1/2011 | Fujiwara | H01M 10/46 |
| | | | | 320/108 |
| 2011/0084658 | A1* | 4/2011 | Yamamoto | B60L 5/005 |
| | | | | 320/108 |
| 2011/0181240 | A1* | 7/2011 | Baarman | B60L 11/182 |
| | | | | 320/108 |
| 2011/0199028 | A1* | 8/2011 | Yamazaki | H02J 7/0054 |
| | | | | 318/139 |
| 2012/0161696 | A1* | 6/2012 | Cook | B60L 11/182 |
| | | | | 320/108 |
| 2012/0161721 | A1* | 6/2012 | Neethimanickam | H02J 17/00 |
| | | | | 320/167 |
| 2012/0187903 | A1* | 7/2012 | Tabata | H02J 7/025 |
| | | | | 320/108 |
| 2012/0206098 | A1* | 8/2012 | Kim | B60L 11/182 |
| | | | | 320/108 |
| 2012/0212178 | A1* | 8/2012 | Kim | H02J 7/025 |
| | | | | 320/108 |
| 2012/0268238 | A1* | 10/2012 | Park | G07F 15/006 |
| | | | | 340/5.8 |
| 2012/0326658 | A1* | 12/2012 | Kim | H02J 7/00 |
| | | | | 320/108 |
| 2013/0015813 | A1* | 1/2013 | Kim | H02J 7/00 |
| | | | | 320/108 |
| 2013/0035814 | A1* | 2/2013 | Boyer | B60L 11/1816 |
| | | | | 701/22 |
| 2013/0063085 | A1* | 3/2013 | Takada | B60L 11/182 |
| | | | | 320/108 |
| 2013/0099733 | A1* | 4/2013 | Park | H02J 7/0034 |
| | | | | 320/108 |
| 2013/0147426 | A1* | 6/2013 | Misono | B60R 16/03 |
| | | | | 320/108 |
| 2013/0285603 | A1* | 10/2013 | Zeinstra | H02J 7/025 |
| | | | | 320/108 |
| 2014/0091755 | A1* | 4/2014 | Walley | H02J 5/005 |
| | | | | 320/108 |

FOREIGN PATENT DOCUMENTS

| | | | | |
|---|---|---|---|---|
| JP | 11-103531 | A | 4/1999 | |
| JP | 2000287369 | A * | 10/2000 | ................ H02J 7/00 |
| JP | 2002-290131 | A | 10/2002 | |
| JP | 2008-172872 | A | 7/2008 | |
| JP | 2008-210861 | A | 9/2008 | |
| JP | 2010-206871 | A | 9/2010 | |
| KR | 10-2007-0017530 | A | 2/2007 | |
| KR | 10-2011-0069869 | A | 6/2011 | |
| WO | 2005-109597 | A1 | 11/2005 | |

* cited by examiner

Fig. 7 --Prior Art--
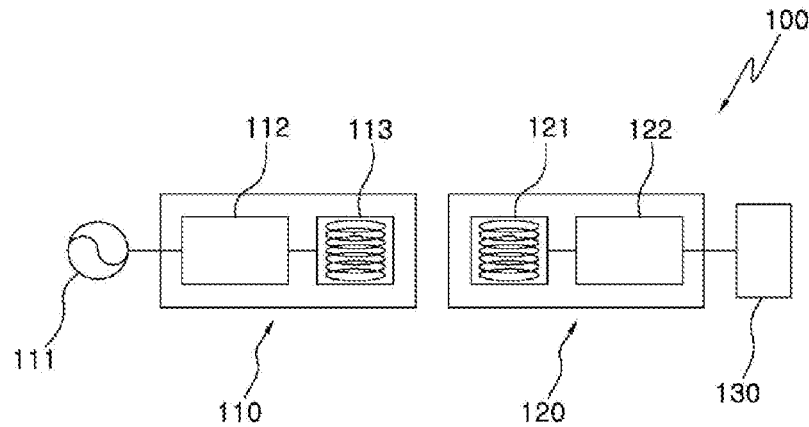
Fig. 8 --Prior Art--
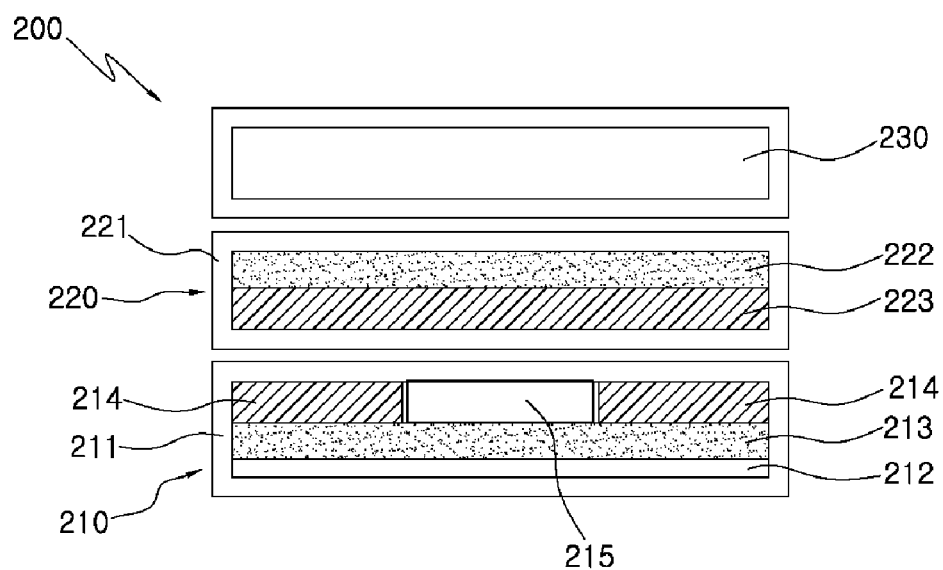

CONTACTLESS CHARGING SYSTEM AND CONTACTLESS CHARGING METHOD

CROSS-REFERENCE TO RELATED APPLICATION

This application claims the benefit of Korean Patent Application No. 10-2011-0109248, filed on Oct. 25, 2011 and Korean Patent Application No. 10-2011-0116100, filed on Nov. 8, 2011 and Korean Patent Application No. 10-2012-0043508, filed on Apr. 25, 2012 in the Korean Intellectual Property Office, the disclosure of which is incorporated herein by reference.

TECHNICAL FIELD

The present invention relates to an electromagnetic induction type contactless charging system, and more particularly, to an electromagnetic induction type contactless charging system suitable for a portable device and a contactless charging method applied thereto.

BACKGROUND ART

A battery for supplying power is required to operate various types of portable devices including a portable phone and a charging type battery is widely used as the battery. Wired (contact) charging is typically applied to the charging type battery, but in recent years, contactless (wireless) charging has been widely used.

One of the most generally contactless charging types is an electromagnetic induction type and FIG. 7 is a conceptual diagram of a general electromagnetic induction type contactless charging system. As illustrated in the drawing, the contactless charging system 100 includes a transmitter 110 and a receiver 120. The transmitter 110 includes a transmission circuit 112 that operates by receiving AC power 111 and a primary coil 113 for electromagnetic induction. The receiver 120 includes a secondary coil 121 that causes the electromagnetic induction with the primary coil 113 of the transmitter 110 and a charging circuit 122. When a battery 130 is connected to the charging circuit 122 of the receiver 120 and the secondary coil 121 is positioned at a predetermined location of the primary coil 113 that receives the AC power, the battery 130 is charged by the electromagnetic induction.

Electromagnetic induction type contactless charging for the portable device represented as the portable phone is standardized in the Wireless Power Consortium (WPC). The WPC uses a charging frequency (i.e., 110 to 205 kHz) in a predetermined band in power transmission by the electromagnetic induction and standardizes the electromagnetic induction type contactless charging for charging within a transmission distance of tens of millimeters.

The contactless charging system applied to the portable phone includes a type that uses a 'charging cover' independent from the portable phone. The receiver including the secondary coil and the charging circuit is installed in the charging cover. While a battery of the portable phone is electrically connected to the charging cover by a connector or a cable, the charging cover is loaded on the transmitter (charging pad) to charge the battery. However, when the charging cover is used, there is inconvenience that the charging cover needs to be additionally provided for the contactless charging of the portable phone.

Instead of the charging cover, there has been developed a product in which the receiver (including the secondary coil and the charging circuit, in this case, the charging circuit may be installed in a body of the portable phone) is installed in a battery cover (a rear cover a plastic synthetic resin injection matter which opens and closes a rear surface of the portable phone in order to replace the battery) which is a part of the portable phone to execute the contactless charging by the portable phone itself without the additionally charging cover.

FIG. 8 is a schematic cross-sectional view of a known contactless charging system applied to the portable phone. The contactless charging system 200 of FIG. 8 includes a charging pad 210 which is the transmitter and a battery cover 220 of the portable phone which is the receiver.

The charging pad (transmitter) 210 is embedded with components of the transmitter in a case 211 made of a plastic synthetic resin. In detail, the charging pad 210 has a structure in which a circuit substrate 212 is laminated on a bottom of the case 211, ferrite 213 is laminated thereon and thereafter, a loop-shaped primary coil 214 is laminated on the ferrite 213 and a permanent magnet 215 is installed at the center of the primary coil 214. The battery cover (receiver) 220 has a structure in which ferrite 222 and a secondary coil 223 are buried in a plastic injection matter 221, however, the ferrite 222 is laminated between the battery cover 220 and the battery 230 in an upper part of the battery cover 220, and the secondary coil 223 is laminated on a bottom of the ferrite 222.

In the contactless charging by the electromagnetic induction, when the secondary coil is position at a predetermined location of the primary coil (when a center point of the primary coil and a center point of the secondary coil vertically coincide with each other), maximum charging efficiency is achieved. In this case, as the secondary coil deviates from a regular position with respect to the primary coil, charging efficiency is decreased due to transfer loss of a magnetic field and heat is emitted while compensating the decreased charging efficiency. Further, when the secondary coil is further distant from the primary coil by a predetermined deviation distance (i.e., 20 mm) or more, an electromagnetic field formed in the primary coil cannot be sufficiently transferred to the secondary coil, and as a result, charging is stopped.

The aforementioned Wireless Power Consortium (WPC) presents several standards as a measure for increasing the charging efficiency of the contactless charging.

A first standard is a "magnet type contactless charging system" that the permanent magnet is installed at the centers (alternatively, only at the center of the primary coil) of the primary coil and the secondary coil to induce a position of a quantum coil to the regular position by magnetic force.

A second standard is a "coil movable contactless charging system" that regularly positions the secondary coil to the primary coil by moving the primary coil to the position of the secondary coil with a stepping motor by detecting the position of the secondary coil when the receiver (secondary coil) is loaded on the transmitter (primary coil).

A third standard is a "plural coil type contactless charging system" that when a plurality of primary coils are installed and the secondary coil is loaded thereon, current is applied to the primary coil which is most adjacent to the secondary coil to increase induced electromotive force between the primary coil and the secondary coil.

The "coil movable contactless charging system" and the "plural coil type contactless charging system" have a problem that a product price is relatively increased due to an increase of the number of components as compared with the "magnet type contactless charging system". In particular, the "coil movable contactless charging system" has a limit in restricting a weight of the primary coil in order to reduce a load applied to the stepping motor. The "plurality coil type contactless charging system" has a problem that the size of the transmitter is excessively increased due to an array structure of the primary coils, while the sizes of the primary coils need to be restricted.

By such a background, in the "coil movable contactless charging system" and the "plural coil type contactless charging system", the charging efficiency is decreased by 10% or more as compared with the "magnet type contactless charging system", and as a result, practically, the "magnet type contactless charging system" is used relatively more.

However, the "magnet type contactless charging system" has a problem that although the position of the quantum coil may be maintained to the regular position at relatively low cost, when this is applied to the portable phone, the size and the weight of the portable phone are increased due to addition of the magnet and the applied magnet may cause a misoperation of a magnetic field using device (i.e., a compass, a gyro sensor, and the like) embedded in the portable phone.

The contactless charging system 200 of FIG. 8 applied to the portable phone has a configuration in which a permanent magnet 215 is installed only in the charging pad 210 and the ferrite 222 of the battery cover 220 is thus attached to the permanent magnet 215 to induce the position of the secondary coil to the regular position of the primary coil. When the permanent magnet 215 is to be applied to only the primary coil 214 as described above, magnetic force of the permanent magnet acts on the ferrite 222 having a large area, and as a result, since a deviation of the position of the secondary coil from the position of the primary coil may occur, it is difficult to ensure optimal charging efficiency. Further, in order to prevent the electromagnetic field from being distorted due to interaction of a permanent magnet having a high intensity of the magnetic field and high permeability and a metallic element of the battery, relatively thick ferrite 222 needs to be used for the battery cover 220, which exerts a bad influence on minimization and weight lightening of the portable phone.

The WPC standard presents a "variable frequency type contactless charging system" as another method that supplements the charging efficiency of the electromagnetic induction type contactless charging system.

A "variable frequency type" is a scheme that by applying an algorithm of a proportional integral differential (PID) control for a best power transmission control, the charging frequency used in the contactless charging is varied in proportion to the charging efficiency and the power of the transmitting unit is varied in inverse proportion to the charging efficiency (see 5.2.3.1 Power transfer control of WPC Spec Ver 1.0.3).

The "variable frequency type" is independently applied or together applied in merge with the aforementioned "magnet type contactless charging system" or "coil movable contactless charging system".

The "variable frequency type" uses the charging frequency used in the contactless charging variably in proportion to the charging efficiency, for example, in the range of minimum 110 kHz and maximum 205 kHz. For example, as the primary coil and the secondary coil get close to the regular position (as the charging efficiency is higher), a charging frequency which gets close to 205 kHz is used and as the second coil is further separated from the regular position relative to the primary coil (as the charging efficiency is lower), current applied to the primary coil is increased while using a charging frequency which gets close to 110 kHz to maintain the charging efficiency of the battery at least at predetermined charging efficiency or more.

That is, in the "variable frequency type", when as the primary coil of the transmitting unit and the secondary coil of the receiving unit get close to the regular position, relatively more electromagnetic fields are transferred, and as a result, when the power transfer loss is relatively lower, the transmitting unit applies relative lower power having a relatively higher charging frequency, whereas when as the quantum coil is further separated from the regular position, a relatively lower electric field is transferred and the power transfer loss is relatively high, high power having a relatively lower charging frequency is applied to the primary coil to supplement charging efficiency loss by separation of the secondary coil from the regular position relative to the primary coil.

However, in the "variable frequency type", although the charging efficiency is supplemented by changing the charging frequency and the power, for example, when the secondary coil is positioned at an outermost position within a primary coil chargeable range, the charging efficiency is decreased as compared with maximum charging efficiency by approximately 20% or more and in this case, serious heat emission is caused due to an excessive increase of power applied for supplementing the charging efficiency.

In the known contactless charging system described above, the secondary coil deviates from the regular position relative to the primary coil, but when the secondary coil is within a chargeable range, charging is executed and it is marked that the secondary coil is in charge, and as a result, a user cannot know a state that the charging efficiency is low and heat is emitted and continuously performs charging. Consequently, unnecessary power consumption may be caused or a safety problem may occur due to the heat emission.

Accordingly, in the electromagnetic induction type contactless charging system, it is very important to position the secondary coil from the regular position of the primary coil and the heat emission needs to be minimized even though the secondary coil deviates from the regular position of the primary coil.

Related art associated with the contactless charging of the portable phone includes 'Contactless Charging System of Wireless Phone' of Korean Patent Application Issue No. 10-1995-0005819 (Issued on May 31, 1995) and 'Wireless Charging Device' of Korean Utility Model No. 20-0217303 (registered on Jan. 8, 2001).

In association with enhancement of the charging efficiency in the electromagnetic induction type contactless charging, there are proposed methods that induce the user to perform charging at higher charging efficiency by detecting (current or voltage) and acquiring the charging efficiency based on the detected power to be displayed to the user.

In percentage efficiency acquired by detecting the power (current or voltage) in the portable phone, a ratio of power consumed in an output for power supplied from an input may be represented by a percentage, that is, (Power_out/Power_in)×100. Herein, "Power_out" represents "charging voltage×charging current" of the battery and is controlled in the portable phone and "Power_In" represents "supply voltage×consumed current" of the transmitting unit (charging pad).

For example, when it is assumed that charging voltage supplied to the battery is 5 V in a rectifier circuit (Power_out) of the secondary coil and charging current is charged with 600 mA, the output power (Power_out) is 3 W and charging efficiency of power consumed in the primary coil of the charging pad is approximately 70% when it is assumed that DC supply voltage (i.e., 19 V) of the charging pad is constant and consumed current of the charging pad is approximately 226 mA.

The percentage charging efficiency acquired by detecting the power (voltage or current) may be acquired only by measuring both input power of the charging pad and output (charging) power of the portable phone and thereafter, transferring a value measured in one device (the charging pad which is the transmitting unit or the portable phone which is the receiving unit) to the other device (the portable phone which is the receiving unit or the charging pad which is the transmitting unit).

However, since two devices (the charging pad and the portable phone) are separated from each other, an additional wireless communication means for data transmission is required to transfer the power (current or voltage) measured in any one device to the other device, and as a result, calculation of the charging efficiency by the measurement value of the power (voltage or current) is an inefficient and very complicated method.

Moreover, in, for example, a lithium ion (Li-ion) or lithium polymer (Li-Polymer) battery, in order to ensure stability such as preventing the danger of explosion by rapid charging and discharging, when it is considered that charging current introduced into the battery is appropriately controlled in the portable phone (i.e., Trickle Charge, Pre-Charge, Fast Charge, and End of charge) and the charging voltage is also requested to be constantly maintained, calculation of the charging efficiency based on the power (voltage or current) is not easily applied to an actual use environment of the portable phone.

Other related art for enhancing the charging efficiency of the contactless charging system includes 'System and Method of Wireless Charging' of Korean Patent Application Laid-Open No. 10-2010-0074595 (published on Jul. 2, 2010), 'Contactless Charging Device' of Korean Patent Registration No. 10-1063154 (registered on Sep. 1, 2011), 'Position Recognition Contactless Power Supply Device and Battery Charging Device and Charging System Using the Same' of Korean Patent Application Laid-Open No. 10-2009-0025876 (published on Mar. 11, 2009), and 'Contactless Charging Device having Charging State Display Function and Charging Method Thereof' of Korean Patent Application Laid-Open No. 10-2009-0059507 (Jun. 11, 2009).

DETAILED DESCRIPTION OF THE INVENTION

Technical Problem

An object of the present invention is to an electromagnetic induction type contactless charging system which outputs charging efficiency of a battery to enable a user to know the charging efficiency, a user is induced to control the position of a secondary coil relative to a primary coil to a position having higher charging efficiency to charge the battery with higher charging efficiency, thereby reducing unnecessary power consumption and reducing heat emission generated during a charging process.

Another object of the present invention is to minimize a problem of the heat emission which may occur during the charging process in the electromagnetic induction type contactless charging system.

Technical Solution

According to the present invention, provided is a contactless charging system.

The contactless charging system according to the present invention includes a transmitting unit having a primary coil and a receiving unit having a secondary coil and charges a battery electrically connected to the secondary coil by electromagnetic induction generated between the primary coil and the secondary coil.

The contactless charging system according to the present invention supplements charging efficiency of the battery by varying a charging frequency used in the electromagnetic induction in proportion to the charging efficiency battery that varies according to the position of the secondary coil relative to the primary coil.

The contactless charging system according to the present invention includes a charging efficiency notifying device installed in the transmitting unit or the receiving unit. The charging efficiency notifying device includes a frequency detecting unit detecting the charging frequency when charging is performed by making the receiving unit get close to the transmitting unit and a notification unit outputting the charging efficiency acquired from the detected charging frequency to enable a user to know the charging efficiency of the battery.

A contactless charging method according to the present invention includes detecting the charging frequency when charging is performed by making the second coil get close to the primary coil; and outputting the charging efficiency acquired from the detected charging frequency to enable a user to know the charging efficiency of the battery.

The contactless charging method according to the present invention may include warning deviation of the secondary coil from a regular position relative to the primary coil when the charging efficiency of the battery acquired from the detected charging frequency is lower than predetermined charging efficiency.

The contactless charging method according to the present invention may include setting charging current of the battery to a relatively low value or stopping the contactless charging when a change of the charging frequency by changing of the position of the receiving unit relative to the transmitting unit is not detected within a predetermined time after the warning of the deviation from the regular position.

In the contactless charging method according to the present invention, the detecting of the charging frequency may include calibrating the charging frequency used in the electromagnetic induction by detecting the charging frequency at a plurality of positions of the receiving unit relative to the transmitting unit, acquiring a minimum value and a maximum value from the plurality of detected charging frequencies and adjusting an offset value herein.

The contactless charging method according to the present invention may include setting the charging current of the battery to be proportional to the charging frequency in such a manner that when the charging frequency detected in the detecting of the charging frequency is relative high, relatively high charging current is set and when the detected charging frequency is relatively low, relatively low charging current is set.

In the contactless charging method according to the present invention, when the detected charging frequency may be lower than a predetermined frequency, the contactless charging may be stopped.

Effects of Invention

In a contactless charging system and a contactless charging method according to the present invention, charging efficiency of a battery is notified by a method that enables a user to know the charging efficiency and the user is induced to control the position of a secondary coil (receiving unit) relative to a primary coil (transmitting unit) to a position having higher charging efficiency, and as a result, contactless charging of the battery may be executed with high charging efficiency as possible to reduce energy waste by unnecessary power consumption and minimize a problem of heat emission which occurs during a charging process.

According to the present invention, by using a charging frequency having the same value in the transmitting unit and the receiving unit, which is varied in proportion to the charging efficiency of the battery to acquire the charging efficiency of the battery to be notified to the user, related data need not be transmitted between the transmitting unit and the receiving unit in order to acquire the charging efficiency.

According to the present invention, by setting charging current to be proportional to the charging efficiency of the battery (charging frequency), it is possible resolve a problem of heat emission caused due to a decrease of the charging efficiency depending on deviation of the secondary coil from a regular position relative to the primary coil.

BRIEF DESCRIPTION OF DRAWINGS

FIG. 7 is a schematic view of a general known electromagnetic induction type contactless charging system, and FIG. 8 is a schematic cross-sectional view of the electromagnetic induction type contactless charging system applied to a known portable phone.

BEST MODE FOR CARRYING OUT THE INVENTION

Hereinafter, a contactless charging system and a contactless charging method according to the present invention will be described in detail with reference to the accompanying drawings. A detailed example described below just exemplarily describes the present invention and does not intend to restrict a scope of the present invention.

Figure 1:
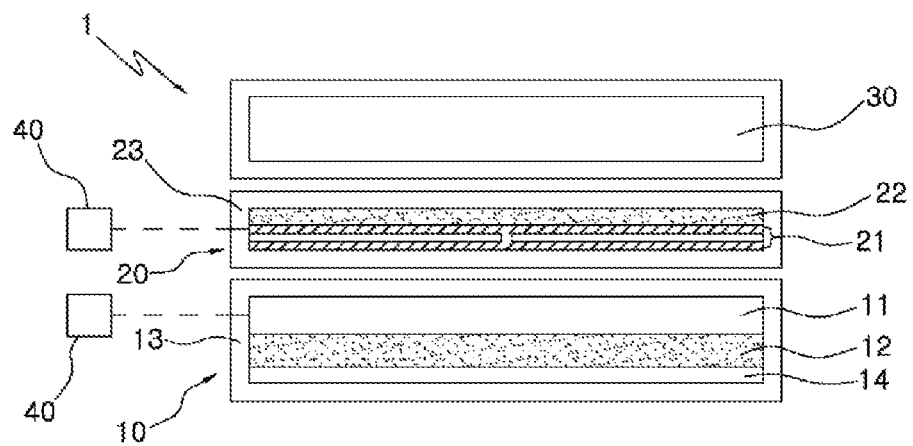
FIG. 1 is a schematic view of an exemplary contactless charging system according to the present invention.

As illustrated in FIG. 1, the contactless charging system 1 according to the present invention as, for example, an electromagnetic induction type system suitable to be used for charging a battery of a portable device represented by a portable phone includes a transmitting unit 10 including a primary coil 11 and a receiving unit 20 including a secondary coil 21 similarly as in the related art.

A detailed example illustrated in FIG. 1 is an example in which a charging pad is applied as the transmitting unit 10 and a battery cover 20 of the portable phone is applied as the receiving unit 20, and hereinafter, the same reference numeral "10" is used for the transmitting unit and the charging pad and the same reference numeral "20 is used for the battery cover and the receiving unit.

The charging pad 10 as the transmitting unit illustrated in FIG. 1 is an example in which a substrate 14 such as a printed circuit board (PCB) is laminated on an internal bottom of a case 13 made of a plastic synthetic resin, and the like, transmitting unit ferrite 12 is laminated on the substrate 14, and the primary coil 11 is laminated on the transmitting unit ferrite 12. The battery cover 20 as the receiving unit illustrated in FIG. 1 is an example in which the secondary coil 21 for electromagnetic induction is laminated in a lower part of a plastic injection matter 23 and receiving unit ferrite 22 is laminated in an upper part.

Figure 2:
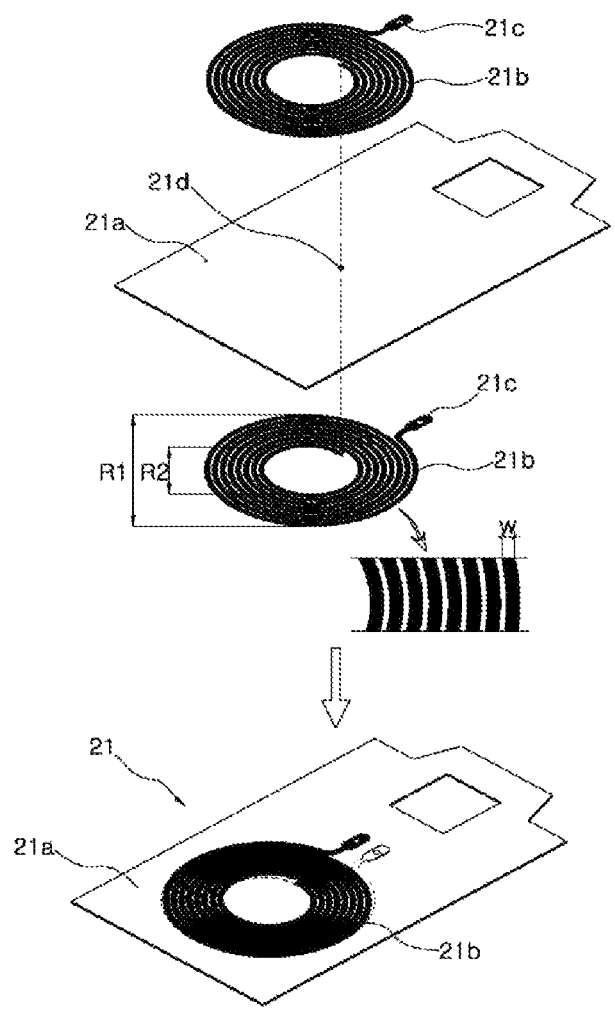
FIG. 2 is a schematic view of an exemplary secondary coil applied to the present invention.

The secondary coil 21 may be provided in a form in which a loop-pattern conductive thin film 21b forming a coil is laminated on a base thin film 21a, as illustrated in FIG. 2. In detail, the secondary coil 21 may be formed by etching conductive thin films of both upper and lower surfaces according to a desired pattern (loop form) relative to a conductive thin film of which both upper and lower surfaces of the base thin film 21a such as a polyimide film (i.e., a thickness of 0.025 mm or less) are coated with the conductive thin film 21b (i.e., a thickness of 0.070 mm to 0.105 mm) such as a copper foil.

In this case, a loop-shaped coil 21b and one terminal connector 21c are formed on the conductive thin film on one surface of the conductive thin film and the loop-shaped coil 21b and one terminal connector 21c are formed even on the conductive thin film on the other surface and thereafter, a via hole 21d is formed on the base thin film 21a at a position corresponding to an inner end of upper and lower coils and plating is performed through the via hole 21d to electrically connect coils on both upper and lower surfaces.

The secondary coil 21 may be manufactured by various other methods such as forming the coil only on one surface of the base thin film by using one conductive thin film coated with the conductive thin film on not both surfaces of the conductive thin film but only one surface, printing the loop-pattern coil on one surface or both surfaces of the base thin film with conductive ink without applying an etching process, forming the loop-pattern coil by not etching but pressing one surface or both surfaces of the conductive thin film, and the like if the secondary coil 21 may serve as a receiving unit coil of the contactless charging.

As the receiving unit ferrite 22, ferrite in which manganese and nickel are mixed with an appropriate amount may be used to correspond to a charging frequency band standardized in the WPC.

The secondary coil 21 and the receiving unit ferrite 22 may be buried in the plastic injection matter 23 by an in-mold injection method or the secondary coil 21 and the receiving unit ferrite 22 are attached onto an inner surface of a completed battery cover 20 to be positioned between the battery cover 20 and the battery 30.

When the contactless charging system 1 of the present invention is applied to the portable phone, for example, the secondary coil 21 having 0.25 mm or less and for example, the receiving unit ferrite 22 having 0.30 or less, which are manufactured by the method described above are applied to the battery cover 20, the secondary coil 21 and the ferrite 22 are applied to the plastic injection matter 23 of the battery cover 20, and as a result, the thickness is just increased just by 0.55 mm or less, thereby achieving miniaturization and weight lightening of the portable phone.

When a permanent magnet is applied to position the secondary coil to the regular position of the primary coil as described above, the permanent magnet increases loss of a ferrite seat to interfere with the electromagnetic induction between the primary coil and the secondary coil. Therefore, the contactless charging system 1 of the present invention is basically applied to a system without the permanent magnet, but merging with the application of the permanent magnet is not excluded.

The contactless charging system 1 according to the present invention is applied to a system to which the "variable frequency type contactless charging system" of the aforementioned WPC standard is applied. That is, the present invention is applied to a contactless charging system configured to charge the battery 30 electrically connected to the secondary coil 21 by the electromagnetic induction between the primary coil 11 and the secondary coil 21 and supplement the charging efficiency of the battery 30 by varying the charging frequency used for the electromagnetic induction in proportion to the charging efficiency of the battery 30.

As described above, the "variable frequency type contactless charging system" varies the charging frequency (i.e., 110 to 205 kHz) in order to supplement the charging efficiency which is decreased by deviation of the secondary coil from the regular position relative to the primary coil. Therefore, as both coils get close to the regular position (that is, as the charging efficiency is higher), a higher charging frequency (i.e., maximum 205 kHz) is used for the electromagnetic induction and as both coils further deviate from the regular position (that is, as the charging efficiency is lower), a lower charging frequency (i.e., minimum 110 kHz) is used, and as a result, the charging frequency used for the electromagnetic induction has a correlation proportional to the charging efficiency and in other words, the charging frequency has a correlation which is inversely proportional to a deviation distance of a quantum coil from the regular position.

The correlation of the charging frequency and the charging efficiency of the variable frequency type contactless charging system according to the WPC standard may be illustrated in Table 1 and referring to Table 1, it may be known that the charging frequency and the charging efficiency have a proportional correlation.

TABLE 1

| Detected charging frequency (kHz) | Charging efficiency (%) | Position of secondary coil relative to primary coil | Charging efficiency output to charging efficiency notifying device |
|---|---|---|---|
| 200 or more | 75 | Get closer to regular position ↑ ↓ Further deviate from regular position | 5 |
| 180 | 70 | | 4 |
| 160 | 65 | | 3 |
| 140 | 55 | | 2 |
| 130 | 50 | | 1 |
| 120 | 40 | | Warning - charging stopped |
| Less than 110 | 35 | | Charging disabling (warning) |

The contactless charging system 1 according to the present invention includes a charging efficiency notification device 40. The charging efficiency notification device 40 detects the charging frequency used for the electromagnetic induction, which is proportional to the charging efficiency and acquires the charging efficiency from the detected charging frequency to output the acquired charging efficiency by a method which the user can know.

The charging efficiency notification device 40 includes a frequency detecting unit 41 and a notification unit 42. The frequency detecting unit 41 detects a charging frequency used when performing charging by making the receiving unit 20 get close to the transmitting unit 10 and the notification unit 42 outputs the charging efficiency of the battery 30 acquired from the charging frequency detected by the frequency detecting unit 41 so that the user knows the charging efficiency.

The charging efficiency notification device 40 may be installed in the charging pad (transmitting unit) 10 or a portable phone in which the battery cover (receiving unit) 20 is mounted. Illustrating the charging efficiency notification device 40 at both the charging pad 10 and the battery cover 20 in FIG. 1 schematically represents that the charging efficiency notification device 40 may be installed even in any one of the charging pad 10 and the battery cover 20.

Figure 3:
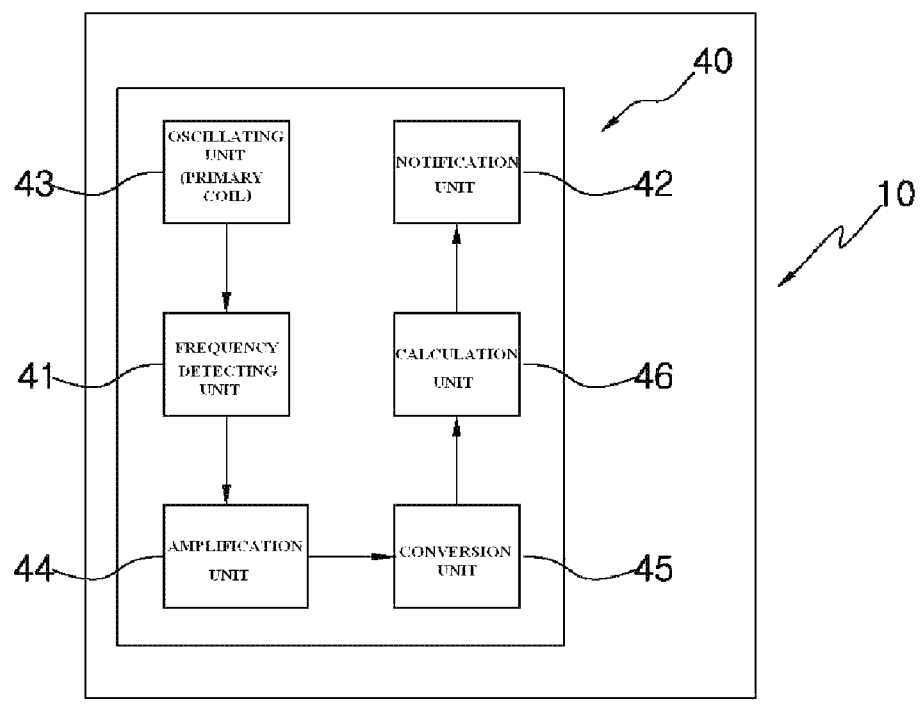
FIG. 3 is a block diagram of an exemplary charging efficiency notifying device of the contactless charging system according to the present invention.

FIG. 3 illustrates an example in which the charging efficiency notification device 40 is installed in the charging pad 10 and the frequency detecting unit 41 detects a charging frequency oscillated from the primary coil 11 by an oscillating unit 43, an amplification unit 44 amplifies the detected charging frequency at an appropriate level, a conversion unit 45 converts the amplified charging frequency into a digital signal, a calculation unit 46 acquires the charging efficiency corresponding to the detected charging frequency based on the proportional correlation of the charging frequency and the charging efficiency, and the notification unit 42 outputs the charging efficiency by the method which the user can know.

Figure 4:
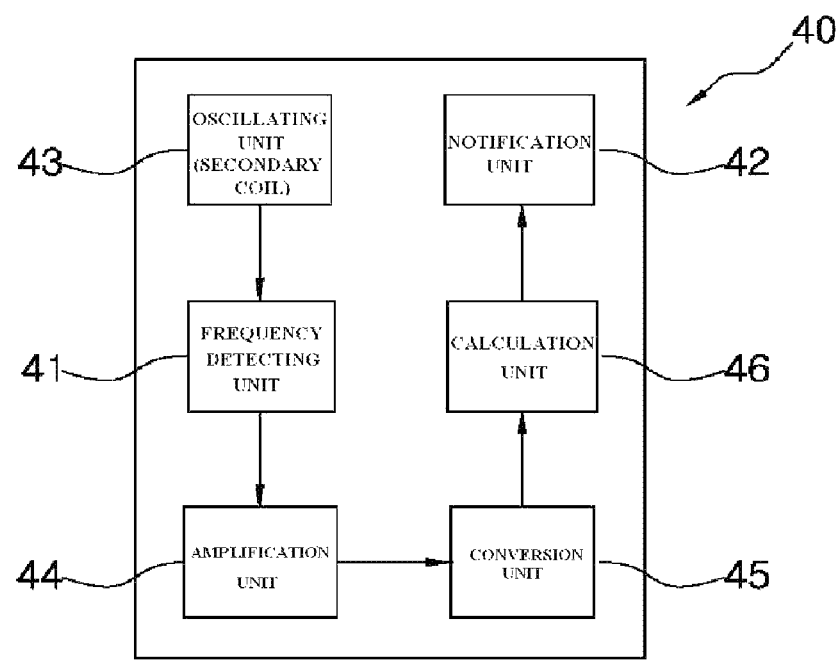
FIG. 4 is a block diagram of another exemplary charging efficiency notifying device of the contactless charging system according to the present invention.

FIG. 4 illustrates an example in which the charging efficiency notification device 40 is installed at the portable phone, and the frequency detecting unit 41 detects a charging frequency from the secondary coil 21 electromagnetically induced by the primary coil 11 and acquires the charging efficiency from the detected charging frequency through the amplification unit 44, the conversion unit 45, and the calculation unit 46, and the notification unit 42 outputs the charging efficiency to enable the user to know the output charging efficiency.

As the notification unit 42, any unit which outputs the charging efficiency to enable the user to easily recognize the charging efficiency may be used and for example, at least one of a visual display device such as an LCD or an LED and an acoustic audio device such as a speaker may be applied.

In the present invention, notifying the charging efficiency of the battery 30 to the user through the notification unit 42 means including all visual and acoustic outputs that allow the user to a state (i.e., good, bad, or the like) of the charging efficiency at that time when performing charging by making the secondary coil (receiving unit) 21 get close to the primary coil (transmitting unit) 11.

When the display device is applied as the notification unit 42, as a method for displaying the charging efficiency by stages of stages 1 to 5 (see Table 1), all methods that allow the user to easily recognize the charging efficiency including displaying the charging efficiency by percentage figures, displaying the charging efficiency by a bar graph, displaying the charging efficiency by colors, and the like may be used.

When the charging efficiency is output to the display device, a text or a video may be output, which is used to recommend moving the position of the portable phone (receiving unit) relative to the charging pad (transmitting unit) to the regular position when the charging efficiency does not reach a predetermined reference.

When the audio device is applied as the notification unit 42, sound such as "bad", "normal", or "good" is output through the speaker and sound for recommending moving the position of the portable phone (receiving unit) relative to the charging pad (transmitting unit) to the regular position may be output.

The user sees or hears a visual and/or acoustic notification content output through the notification unit 42 and moves the position of the portable phone (that is, the battery cover) in the charging pad 10 to a position where the charging efficiency is higher when the charging efficiency is low to charge the battery with higher charging efficiency.

When the charging efficiency notification device 40 is installed at the portable phone, the charging efficiency notification device 40 may be installed in a body of the portable phone and in this case, the notification unit 42 preferably serves as the display device (LCD) or the audio device which is used for an original purpose of the portable phone.

Since acquiring the charging efficiency in the contactless charging system 1 according to the present invention is not acquiring the charging efficiency by detecting and transmitting the power (voltage or current) but acquiring charging frequencies having the same value in the transmitting unit 10 and the receiving unit 20, the charging efficiency may be directly acquired by independently detecting the charging frequency in any one of the transmitting unit (charging pad) 10 and the receiving unit (battery cover or portable phone mounted with the battery cover). Therefore, data detected in the transmitting unit and the receiving unit need not be transmitted to and received from each other, as a result, a data transmitting communication means for acquiring the charging efficiency is not required.

Moreover, since the charging current or charging voltage is varied for safety in the portable device such as the portable phone, the system of the present invention acquires the charging efficiency based on not the charging current or charging voltage which is variable according to a charging environment but the charging frequency having only the correlation which is proportional to the charging efficiency, and as a result, the charging efficiency may be accurately and easily acquired without variability and the acquired charging efficiency may be output.

Hereinafter, a contactless charging method according to the present invention will be described.

The contactless charging method of the present invention includes a step of detecting a charging frequency when executing charging by making a secondary coil 21 get close to a primary coil 11, and a step of outputting charging efficiency of a battery 30 acquired from the detected charging frequency visually and/or acoustically.

A user may determine information on the output charging efficiency, retrieve a position of a receiving unit 20 showing higher charging efficiency by moving a position of the receiving unit (a portable phone mounted with a battery cover) 20 relative to a transmitting unit (a charging pad) 10, and charge the battery 30 with higher charging efficiency.

Additionally, since it may be insufficient to make the user recognize a state in which the battery is charged with low charging efficiency only by outputting the charging efficiency through the notification unit 42, in a state in which the charging efficiency acquired from the detected charging frequency does not reach predetermined (limited) charging efficiency (i.e., 50%), discordance of the secondary coil 21 relative to the primary coil 11 may be warned by a method which the user can know such as a warning through the notification unit 42 or a warning through a display device or an audio device of the portable phone mounted with the battery cover (receiving unit) 20 and the user may be induced to more actively move to a more preferable position of the receiving unit 20 relative to the transmitting unit 10 through the discordance warning.

In spite of the discordance warning, when the user neglects the receiving unit 20 without changing the position of the receiving unit 20 relative to the transmitting unit 10, that is, when a charging frequency detected again within a predetermined after the discordance warning is not different from each other the previous charging frequency, the charging current is set to a relatively lower value or contactless charging may be stopped.

That is, since heat may be rapidly emitted in a state in which the charging efficiency is decreased due to deviation of the secondary coil from a regular position relative to the primary coil, current that flows on the secondary coil is decreased or stopped by maintaining the charging current to be lower or stopping the charging in this case to prevent the danger of the heat emission in the secondary coil.

The correlation of the charging frequency and the charging efficiency of Table 1 is just one exemplary correlation which may be applied to the "variable frequency type contactless charging system", and in spite of the charging pad (transmitting unit) which is inter-compatible by adopting the variable frequency type, ranges of charging frequencies are different from each other and an inevitable difference may be occur, and as a result, the contactless charging method according to the present invention measures the difference of the charging frequency which may exist for each charging pad and calibrates the measured difference to more efficiently manage the charging efficiency of the battery for an unspecific charging pad.

For example, an offset value for the correlation of the charging frequency and the charging efficiency illustrated in Table 1 is applied and calibrated to enable the contactless charging with higher charging efficiency.

In detail, in the contactless charging method according to the present invention, when a specific portable phone is contactless charged with a predetermined unspecific compatible charging pad, the step of detecting the charging frequency may further include a step of detecting charging frequencies at plurality of positions by scanning various positions of the receiving unit 30 relative to the transmitting unit 10 and calibrating a charging frequency used in the electromagnetic induction by acquiring a minimum value and a maximum value in the detected charging frequencies and adjusting the offset value.

For example, in calibrating the charging frequency, when charging is started by making the portable phone get close to the charging pad, a content asking whether the charging frequency is calibrated may be output to the notification unit 42, and the like and when the calibration is selected, the charging frequencies are detected in the respective directions by moving the portable phone up and down, and right and left horizontally in the charging pad and thereafter, the lowest charging frequency and the highest charging frequency are detected and a difference of the charging frequency by changing the charging pad is calibrated by readjusting the offset value of the correlation of the charging frequency and the charging efficiency illustrated in Table 1 from the detected charging frequency, thereby achieving higher charging efficiency.

Figure 5:
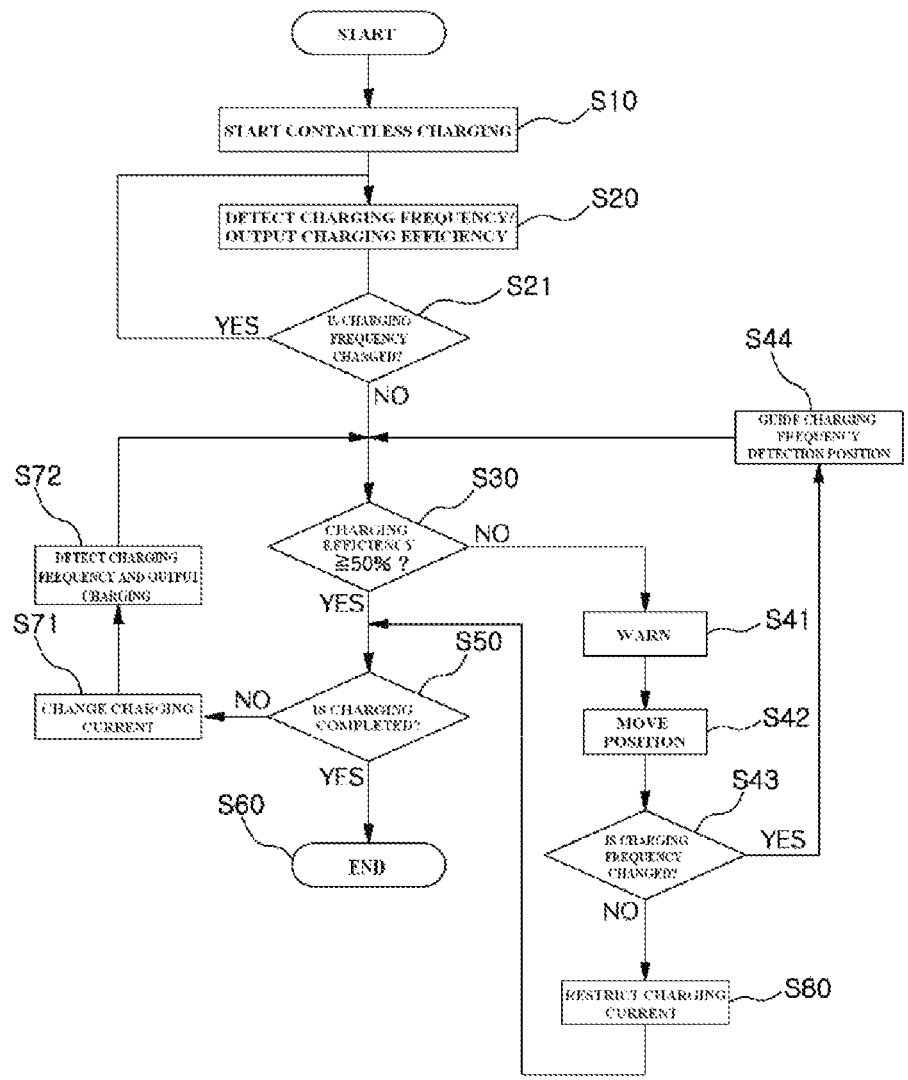
FIG. 5 is a flowchart of an exemplary contactless charging method according to the present invention.

The contact less charging method according to the present invention described above will be exemplarily described through the flowchart of FIG. 5.

In charging the battery, the charging current is generally controlled according to a remaining amount of the battery, and as a result, a charging process is performed in steps of Trickle Charge Mode (within several mA), Pre-Charge Mode (tens of mA), Fast Charge Mode (hundreds of mA), and End of Charge regardless of a wired or wireless method.

When the portable phone (receiving unit) (battery cover) 20 is loaded on the charging pad (transmitting unit) 10, the contactless charging is first started in the Trickle Charge Mode (S10) and the charging efficiency is acquired and output by detecting the charging frequency at the corresponding position (S20).

The user determines the charging efficiency displayed in the notification unit 42 and when the charging efficiency does not reach a desired level, the portable phone may be moved to a position indicating higher charging efficiency by changing the position of the portable phone relative to the charging pad. When the position is moved, the charging frequency is changed, and as a result, the contactless charging system of the present invention may repeat processes of judging whether the charging frequency is changed within a predetermined time (S21) and outputting charging efficiency acquired from the changed charging frequency when the charging frequency is changed (YES, that is, when the user moves the position of the portable phone), and the user may arbitrarily position the portable phone in the charging pad by finding the position indicating the higher charging efficiency through the repeated processes.

When the processes of S20 and S21 are not performed any longer (that is, a predetermined time elapses without changing the charging frequency), it is judged whether finally acquired charging efficiency is higher than (limited) charging efficiency (i.e., 50%) (S30).

When the acquired charging efficiency does not reach predetermined charging efficiency (NO), for example, a warning is given through the notification unit 42 (S41) and the user is induced to move the position of the portable phone relative to the charging pad 10 (S42) and after the predetermined time elapses after the warning, the charging frequency is detected again to judge whether the redetected charging frequency is different from the previous charging frequency (the redetected charging frequency is changed (S43).

When the charging frequency is changed after the predetermined time (YES), the charging efficiency is acquired and output from the changed charging frequency (S44) and in this case, the position (regular position) where the charging efficiency is high may be guided through the notification unit 42, and the like (S44).

When a charging frequency calibration function is installed and the contactless charging is started and thereafter, the user selects a calibration mode (not illustrated), the portable phone is guided to move to the position indicating charging frequencies having a minimum value and a maximum value to calibrate the charging frequency.

Thereafter, it is judged again whether the charging efficiency acquired from the charging frequency detected in step S44 is higher than the limited charging efficiency (S30) and when the corresponding charging efficiency does not reach the limited charging frequency (NO), steps S41 to S44 are repeatedly executed again.

Although the charging efficiency does not reach the predetermined limited charging efficiency, when the user does not change the position of the portable phone in the charging pad, it may be preferably notified (warned) that the user may move the portable phone to the position indicating the higher charging efficiency, and as a result, steps S41 to S44 are a process in which the portable phone is induced to be positioned in the charging pad by finding the position having the higher charging efficiency through the warning.

When the charging efficiency is equal to or higher than the limited charging efficiency in step S30 (YES), it is judged whether the battery charging is completed (S50) and when the battery charging is completed, the charging is ended (S60). In this case, when the battery charging is not completed (NO), the charging current is changed to the Pre-Charge Mode (tens of mA) or the Fast Charge Mode (hundreds of mA) (S71) and the charging frequency is detected again to acquire and output the charging efficiency (S72). In addition, it is judged whether the charging efficiency acquired from the redetected charging frequency is equal to or higher than the limited charging efficiency (S30) and until the charging is completed, the processes of S41 to S44 and S71 and S72 are repeated.

When the charging frequency is not changed within the predetermined time in step S43 (NO), charging is performed by setting the charging current to limited low current (i.e., 300 mA) (S80) and the process returns to step S50 to judge whether the battery charging is completed.

In setting the charging current to the limited current, when the charging current of the battery is generally equal to or lower than, for example, 500 mA, loss is additionally generated even from a circuit structure (TX+RX) in addition to discordance of a magnetic field of the electromagnetic induction, and as a result, it may be preferable to control average charging current by adjusting a duty ratio while rapidly turning on/off charging current of 600 mA or more in which efficiency of the circuit structure is stabilized in terms of efficiency stabilization.

For example, when the charging current is limited to 300 mA due to a decrease of the charging efficiency caused by the deviation of the secondary coil from the regular position relative to the primary coil, since the efficiency is decreased by the circuit structure by continuously setting the charging current to 300 mA, an additional efficiency decrease which may occur in the circuit structure may be reduced while the average charging current is 300 mA by setting the charging current to 600 mA and setting on and off cycles to 1:1. similarly even when the charging current is limited to 400 mA or 200 mA, the efficiency decrease which occurs in the circuit structure may be reduced by adjusting an on/off time.

In FIG. 5, arbitrary position movement by the user depending on step S20 and S21 and positional movement through the warning depending on steps S41 to S44 are both applied, but it is natural that although only any one process between both positional movements is applied, an object of the present invention may be achieved.

In the case of the contactless charging system to which the "magnet type contactless charging system" and the "variable frequency type" of the aforementioned WPC standard are combinationally applied, an offset value of approximately 30 kHz to 40 kHz occurs in the charging frequency due to the magnet applied to the charging pad (transmitting unit) under the same condition, and as a result, for example, a magnetic detection sensor (not illustrated) is additionally installed in the contactless charging system 1 of the present invention and the magnetism is detected by the magnetism detection sensor, the charging frequency may be automatically calibrated as high as the offset value (30 kHz to 40 kHz).

In another detailed example of the present invention, the contactless charging method of the present invention may include setting the charging current of the battery 30 which is proportional to the charging frequency, in such a manner that when the charging frequency detected in the detecting of the charging frequency is relatively high, the relatively high charging current is set and when the detected charging frequency is relatively low, the relatively low charging current is set. In this case, when the detected charging frequency is lower than a predetermined frequency, the contactless charging may be stopped.

That is, in the detailed example, the charging current is not fixed to a predetermined value or set inversely proportional to the charging efficiency, but the charging current is set by the correlation in which the charging current is proportional to the detected charging frequency, and as a result, the charging current may be set to be proportional to the charging efficiency.

According to the detailed example, as the position of the secondary coil gets close to the regular position relative to the primary coil, higher charging current is set and as the position of the secondary coil further deviates from the regular position relative to the primary coil, lower charging current is set.

Table 2 illustrated below shows an example of the charging current set to be proportional to the charging frequency.

TABLE 2

| Detected charging frequency (kHz) | Charging efficiency (%) | Position of secondary coil relative to primary coil | Charging current (mA) |
| --- | --- | --- | --- |
| 200 or more | 75 | Get closer to regular position ↑ ↓ Further deviate from regular position | 800 or more |
| 180 | 70 | | 600 or more |
| 160 | 65 | | 400 or more |
| 140 | 55 | | 300 or more |
| 130 | 50 | | 300 or less |
| 120 | 40 | | Charging stopped |
| 200 or more | 35 | | Charging disabling |

The setting of the charging current proportional to the charging frequency may be implemented, for example, by installing software that varies the charging current by the relationship which is proportional to the charging frequency detected by the frequency detecting unit 41 installed in the portable phone side which is the receiving unit in the portable phone and applying the installed software to the charging circuit.

According to the detailed example, in a state in which the secondary coil gets close to the regular position relative to the primary coil, and as a result, the charging efficiency is relatively higher and a factor of heat emission is lower, charging is performed with relative high charging current to increase a charging speed without a problem of the heat emission and in a state in which the secondary coil deviates from the regular position and the charging efficiency is relatively low and the factor of the heat emission is higher, the charging is performed with relative low charging current to perform the charging while minimizing the heat emission. Consequently, the charging may be performed while minimizing a concern about the heat emission regardless of positioning the secondary coil at the regular position or positioning the secondary coil at a position which deviates from the regular position.

In spite of the chargeable range, a deviation degree of the secondary coil relative to the primary coil is excessive and the factor of the heat emission is very high, and as a result, when the heat emission may not be suppressed to a desired degree only by setting the charging current to a relatively low value, the charging itself is stopped to resolve the heat emission problem caused by the charging.

Referring to Table 3 that shows the position (regular position or an outermost position) of the secondary coil relative to the primary coil, the change (600 mA or 300 mA) of the charging current, and a heat emission temperature by the elapse (0 to 120 minutes) of a charging time, column A represents that the heat emission temperature depending on the charging time is measured in a state in which the secondary coil is positioned at the regular position of the primary coil (the present invention and the related art), column B represents that the secondary coil is positioned at an outermost position in a chargeable range from the center of the primary coil and the heat emission temperature depending on the charging time is measured while the charging current is maintained be high (600 mA) (the related art), and column C represents that the heat emission temperature depending on the charging time is measured while the secondary coil is positioned at the outermost position in the chargeable range from the center of the primary coil and the charging current is maintained to be low (400 mA) (the present invention). The measurement temperature of Table 3 is a temperature which is increased from a room temperature and the measurement temperature may be slightly changed according to a measurement temperature, and the like, but directionality thereof is maintained.

TABLE 3

| | Temperature (° C.) | | |
| --- | --- | --- | --- |
| Charging time (min.): | A (Present invention/related art) Regular position Charging current: 600 mA | B (Related art) Outermost edge Charging current: 600 mA | C (Present invention) Outermost edge Charging current: 300 mA |
| 0 | 32.3 | 50.4 | 30.5 |
| 30 | 36.6 | 72.9 | 40.5 |
| 60 | 38.8 | 73.8 | 44.3 |
| 90 | 39.3 | 73.4 | 45.6 |
| 120 | 40.8 | 92.8 | 45.8 |

As seen from column A of Table 3, in a normal case in which the primary coil and the secondary coil are at the regular position, the heat emission temperature is increased with the elapse of the charging time while the charging current is set to 600 mA, but a degree thereof is relatively slight, in both the present invention and the related art.

As seen from column B of Table 3, in the related art in which the charging current is maintained at 600 mA as it is even though the secondary coil deviates from the primary coil, the heat emission temperature is rapidly increased with the elapse of the charging time and I this case, the charging is performed in a very dangerous state if the position of the secondary coil is not changed to the regular position. In this case, an initial heat emission temperature for preparing for the charging has already reached 50.4° C. because the temperature is increased by the heat emission even in a state to prepare for the charging.

Contrary to this, as seen from column C of Table 3, in the present invention in which the charging current is set to 300 mA as the secondary coil deviates from the primary coil, the heat emission temperature is increased with the elapse of the charging time, but a temperature increasing degree is remarkably reduced as much as there is no risk of the heat emission in spite of continuous charging.

Figure 6:
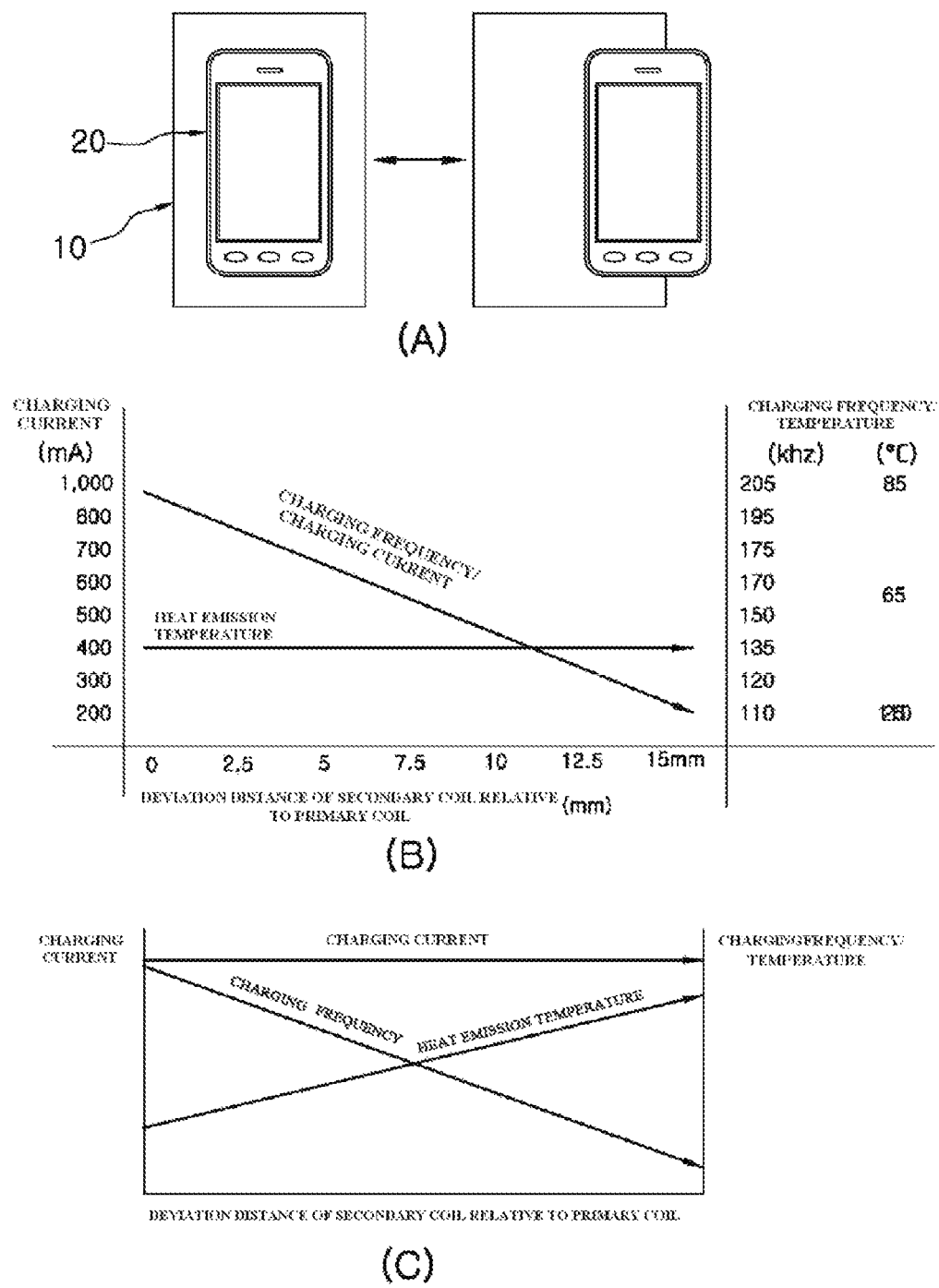
FIG. 6 is a diagram illustrating a concept to control heat emission in the contactless charging method according to the present invention.

FIG. 6 is a diagram illustrating the detailed example of the present invention in which the charging current is set to be proportional to the charging frequency as compared with the related art. When the position of the secondary coil of the receiving unit relative to the primary coil of the transmitting unit is varied between the regular position and the outermost position (see A of FIG. 6), in the present invention (see B of FIG. 6) in which the charging current is set to be inversely proportional to the deviation distance from the regular position, the increase of the heat emission temperature is very slight regardless of the deviation degree of the regular position, but in the related art (C of FIG. 6) in which the charging current is maintained constantly regardless of the position of the secondary coil of the receiving unit relative to the primary coil of the transmitting unit, the heat emission temperature is rapidly increased as the secondary coil further deviates from the regular position.

Consequently, according to the present invention, when the secondary coil deviates from the regular position of the primary coil and the charging is performed by using the relatively low charging frequency in the state in which the charging efficiency is relatively low, the charging current is set to be relatively low and when the detected charging frequency is lower, the contactless charging itself is stopped to minimize heat emission caused by supplementing the decreased charging efficiency and the resulting safety accident. A point of the charging frequency (charging efficiency) to stop the charging may be selected approximately according to a characteristic of the contactless charging system according to the present invention.

The invention claimed is:

1. A contactless charging system which includes a transmitting unit having a primary coil and a receiving unit having a secondary coil, which charges a battery electrically connected to the secondary coil by electromagnetic induction generated between the primary coil and the secondary coil, and which supplements charging efficiency of the battery by varying a charging frequency between 110 kHz and 205 kHz used in the electromagnetic induction in proportion to the charging efficiency battery that varies according to the position of the secondary coil relative to the primary coil, the system comprising:
   a charging efficiency notifying device installed in the transmitting unit or the receiving unit,
   wherein the charging efficiency notifying device includes a frequency detecting unit detecting the charging frequency when charging is performed by making the receiving unit get close to the transmitting unit and a notification unit outputting the charging efficiency acquired from the detected charging frequency to enable a user to know the charging efficiency, and
   wherein the charging frequency used in the electromagnetic induction is calibrated by detecting the charging frequency at a plurality of positions of the receiving unit relative to the transmitting unit, acquiring a minimum value and a maximum value from the plurality of detected charging frequencies and adjusting an offset value herein.

2. A contactless charging method of a contactless charging system which includes a transmitting unit having a primary coil and a receiving unit having a secondary coil, which charges a battery electrically connected to the secondary coil by electromagnetic induction generated between the primary coil and the secondary coil, and which supplements charging efficiency of the battery by varying a charging frequency used in the electromagnetic induction in proportion to the charging efficiency battery that varies according to the position of the secondary coil relative to the primary coil, the method comprising:
   detecting the charging frequency when charging is performed by making the secondary coil get close to the primary coil and outputting the charging efficiency acquired from the detected charging frequency to enable a user to know the charging efficiency,
   wherein the charging frequency used in the electromagnetic induction is calibrated by detecting the charging frequency at a plurality of positions of the receiving unit relative to the transmitting unit, acquiring a minimum value and a maximum value from the plurality of detected charging frequencies and adjusting an offset value herein.

3. The method of claim 2, further comprising: warning deviation of the secondary coil from a regular position relative to the primary coil when the charging efficiency of the battery acquired from the detected charging frequency is lower than predetermined charging efficiency.

4. The method of claim 3, further comprising: setting charging current of the battery to a relatively low value or stopping the contactless charging when a change of the charging frequency by changing of the position of the receiving unit relative to the transmitting unit is not detected within a predetermined time after the warning of the deviation from the regular position.

5. The method of claim 2, further comprising: setting the charging current of the battery to be proportional to the charging frequency in such a manner that when the charging frequency detected in the detecting of the charging frequency is relatively high, relatively high charging current is set and when the detected charging frequency is relatively low, relatively low charging current is set.

6. The method of claim 5, wherein: when the detected charging frequency is lower than a predetermined frequency, the contactless charging is stopped.

* * * * *